United States Patent Office 3,783,034
Patented Jan. 1, 1974

3,783,034
METHOD FOR FORMING AN INSULATING FILM OF GOOD PUNCHING CHARACTERISTICS ON ELECTRICAL STEEL SHEETS AND STRIPS
Minoru Kitayama and Motoharu Nakamura, Himeji, Masanobu Inaoka, Takasago, and Hiroshi Okada, Himeji, Japan, assignors to Nippon Steel Corporation, Tokyo, Japan
Filed Aug. 25, 1971, Ser. No. 174,719
Claims priority, application Japan, Aug. 28, 1970, 45/75,361
Int. Cl. C23f 7/26
U.S. Cl. 148—6.2         6 Claims

ABSTRACT OF THE DISCLOSURE

A process for producing a stable insulating film of good punching characteristics on an electrical steel sheet and strip, which comprises dissolving at least one compound selected from the group consisting of oxides, hydroxides and carbonates of divalent metals to at least about their dissolving limit in a solution containing at least one compound selected from the group consisting of chromic acid and bichromates, adding an emulsion type resin to the solution, and coating the thus obtained treating solution onto a steel sheet and then baking the coated sheet.

---

The present invention relates to a method for forming a stable insulating film of good punching characteristics on electric steel sheets with good efficiency.

Electrical sheets and strips used for motors, transformers etc. must have good punching characteristics in addition to proper insulation. Good punching characteristics means increased number of punching per die, which in turn means elongated life of the die.

The present invention is based on the fact that the punching characteristics largely depend on the insulating film other than on the material, i.e., steel sheet or strip, to be punched. The object of the present invention is to form a stable insulating film having good punching characteristics which will allow more than 300,000 to 800,000 punchings per die. This is more than 10 to 50 times that obtained with the conventional insulating films.

The punching characteristics of a conventional film formed by a treatment of a strip in a chromic acid solution with the addition of a divalent metal oxide is not good as shown in curve (a) of FIG. 2(a) in which the height of the burr reaches 50μ after 80,000 punchings.

A film composed of chromates and an emulsion type resin is disclosed in Japanese patent publication Sho 40/6722.

In general, a film formed by applying a treating solution of chromic acid with the addition of emulsion type resins on a steel sheet and the baking it gives a strip having good punching characteristics. This may be attributed to the fact that the emulsion type resin has a remarkably large molecular weight as compared with water-soluble resins. Thus, the particle size of the emulsion type resin is 0.1–1μ so that even when it is applied on a steel sheet immediately after it is added to a chromic acid solution, it is concentrated near the steel surface and thus serves as solid lubricant even when present in a small amount. Although this type of treating solution gives good results, it has a defect that the emulsion type resin is often destroyed by the chromic acid, and the thus deteriorated resin adheres to the sealing portions of the piping or pumping system and causes clogging. Also when the solution is applied by a roll, the deteriorated resin adheres to the roll so that a uniform film is obtained only for the initial operation period of the roll.

The present invention is to provide an improved method which has completely overcome the above defects.

The feature of the present invention lies in that one or more compounds selected from oxides, hydroxides and carbonates of a divalent metal is dissolved to at least about its dissolving limit (herein called dissolving limit) in a solution containing one or more of chromic acid and bichromates, and then an emulsion type resin is added to the solution to obtain a treating solution. The treating solution is then applied to and baked on the steel sheet to obtain electrical steel sheets and strips having an insulating film of good punching characteristics.

Further, the present inventors have found that the temperature of the treating solution has an influence on the formation of deteriorated resins in the case of a treating solution prepared by adding emulsion type resins. Namely, in actual practice in shops, the steel sheet is subjected to pretreatments comprising degreasing, acid pickling, washing and drying. In this pretreatment, the steel sheet is often heated to 40–60° C., and if the solution is repeatedly applied to the heated steel sheet, the temperature of the treating solution will reach 30° C. and sometimes, even in winter. Due to this temperature increase of the solution, the chromate detrimentally affects the stability of the emulsion type resins and causes deteriorated resin products which produces problems, such as, clogging of the piping and pumping system as mentioned before.

Through investigations on the relation between the temperature of the treating solution and the tonnage of steel sheets which can be treated safely with the solution, it has been found that several hundred tons of steel sheets can be safely treated without any trouble if the solution temperature is below 25° C., preferably below 20° C., but only several tons of steel sheets can be treated if the solution temperature is above 25° C.

Therefore, one of the features of the present invention is that the temperature of the treating solution is forceably cooled below 25° C., preferably 20° C., by a suitable means such as a cooler provided in the circulation system of the treating solution.

As described hereinbefore, when an emulsion type resin is added to a treating solution of one or more of chromic acid and bichromates, the resin is deteriorated and often the solution can not be used. The present inventors have found that deterioration of the emulsion type resin by a solution of one or more of chromic acid, and bichromate can be prevented when one or more compounds selected from oxides, hydroxides, and carbonates of divalent metals is dissolved at least almost up to its dissolving limit in a solution of chromic acid and/or bichromate. In this way the stability of the emulsion type resin in the above solution is remarkably improved and insulating film can be formed on an electrical sheet or strip which is stable for a long time.

The present invention will be described regarding the stability of the treating solution by referring to the attached drawings.

Figure 1:
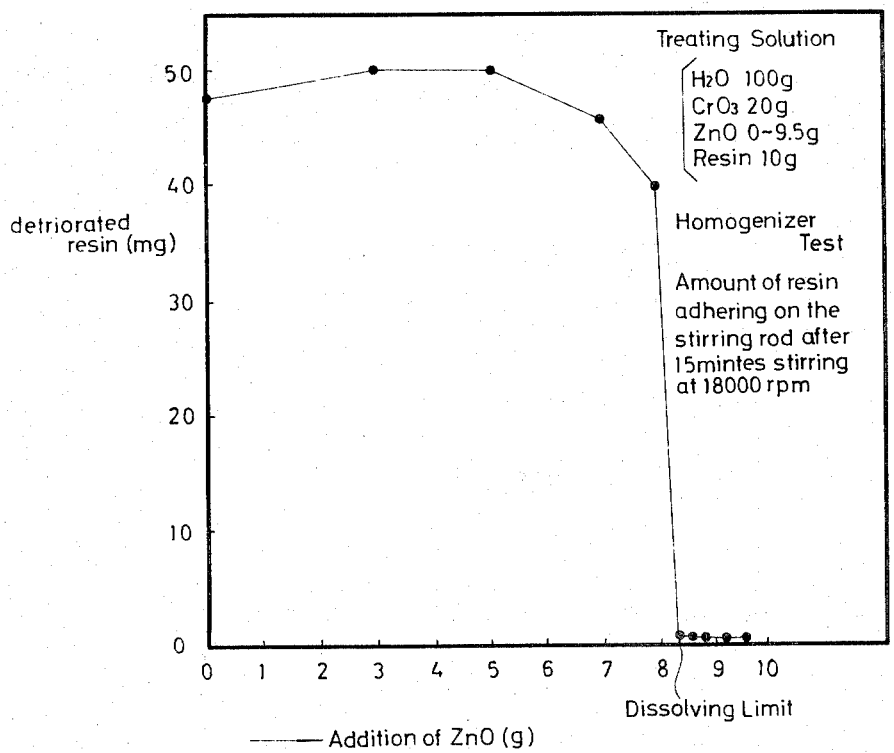
FIG. 1 is a graph showing the stability of the treating solution according to the present invention.

Regarding FIG. 1, 20 g. of chromic acid were dissolved in 100 g. of water, and zinc oxide was added thereto in different amounts from 0 to 9.5 g., and further 10 g. of an emulsion type acrylic resin was added. After one hour of stirring and mixing by a magnetic stirrer, a homogenizer test (a test for determining the stability by measuring the amount of deteriorated resin depositing on the stirrer after 15 minutes stirring at 18,000 r.p.m.) was conducted. As clearly seen from FIG. 1 the amount of deteriorated resin is remarkably large below the dissolving limit (8.3 g.), i.e., the stability of the solution is poor. However, just before the zinc oxide addition reaches to about its dissolving limit, the deteriorated resin sharply decreases and no deteriorated resin is observed when the zinc oxide addition reaches its dissolving limit, i.e., saturation and thus the stability is improved. The stability is also maintained beyond the dissolving limit.

As above described, one or more compounds selected from oxides, hydroxides and carbonates of a divalent metal is dissolved in the treating solution in an amount from just below its dissolving limit to above its dissolving limit, and then the treating solution is used for treating the electrical steel sheet and strip. This treating solution has very high stability so that a stable operation can be conducted for a long time.

The reasons for various limitations in the present invention shall be explained hereinafter.

Regarding the treating solution, one or more from chromic acid and bichromate is used as mentioned above. As for bichromate, a salt of potassium, sodium, magnesium, calcium or zinc, etc., may be used. As for the oxide of the divalent metal to be dissolved in the treating solution, MgO, CaO, ZnO, CdO, etc., for example may be used; as the hydroxide $Mg(OH)_2$, $Ca(OH)_2$, $Zn(OH)_2$, $Cd(OH)_2$ etc. may be used; and as the carbonate, $MgCO_3$, $CaCO_3$, $ZnCO_3$, $CdCO_3$, etc., may be used.

In the present invention, an oxide, a hydroxide or a carbonate, etc., of a divalent metal as mentioned above is added to a solution of chromic acid and/or bichromate in an amount just below their dissolving limit, preferably up to their dissolving limit. In this case, no substantial effect is expected for stabilizing the emulsion type resin up to just below the dissolving limit and thus it is necessary to add the above additives in ranges from just below the dissolving limit up to their dissolving limit, namely, almost up to their saturation point.

For attaining the saturation of the additives it is desirable to add them beyond their dissolution limit because it is very difficult to add them in a precise amount to reach the exact point of their dissolving limit. In this case, however, an excessive addition causes an increased amount of the oxide, etc., of divalent metal to precipitate precipitating in the chromic acid and/or bichromate solution so that even when the emulsion type resin is then added, the dispersing tendency of the oxide, etc., of the divalent metal is not improved and poor punching characteristics in the insulating film are obtained.

On the other hand, when the additives are added to the solution of chromic acid and/or bichromate up to 15 wt. percent beyond their limit, the stability of the treating solution and the stamping property of the film are not adversely influenced and the desired results of the present invention can be obtained. Therefore, the additives are added in an amount of 0.5 to 15 wt. percent beyond their dissolving limit in actual operation. The stated dissolving limit in the present invention covers from the addition just below the dissolving limit to the excessive addition as above mentioned.

As for the emulsion type resin used in the present invention, vinyl acetate resins and their copolymers, butadiene-styrene copolymers, and acrylic resins and their copolymers may be used. These resins are added to the treating solution after the oxide, etc., of the divalent metal, is added thereto so as to stabilize the solution. The amount of these resins to be added is preferably from 0.3 to 30 wt. parts to 10 wt. parts of chromium ion in the solution of chromic acid and/or bichromate. Below 0.3 wt. part, no improvement of the punching characteristics of the film is attained, but beyond 30 wt. parts, carbon remains on the surface of the electrical steel sheets strips after stress-relieving annealing, and weldability also becomes poor.

Regarding the non-conducing inorganic material, such as, boric acid, colloidal silica, colloidal alumina, titanium oxide, etc., to be added in the treating solution and the reducing agents, such as, polyhydric alcohols, amines, carboxylic acids, etc., to be added similarly to the treating solution, the non-conducing inorganic material alone is added in an amount from 0.5 to 10 wt. parts to 10 parts of chromium ion in the solution, and the reducing agents alone are added in an amount from 0.2 to 3 parts to 10 parts of the chromium ion in the solution, or both the inorganic materials and the reducing agents in combination may be added up to the total of their upper limits. In this way, a number of advantages are obtained, such as, insulation resistance after the stress-relieving annealing is increased and the film coating can be effected with good adhesion to the steel sheet even by a high speed coating, e.g., 200 m./min.

As for the coating of the treating solution, it may be done by spraying, roll coating and the like.

The baking temperature for the insulating film is preferably in the range from 200 to 700° C. Below 200° C., the time required for satisfactory baking become longer and thus productivity is poor, while beyond 700° C., a membrane is formed on the film and powders are formed thereon.

The suitable weights of the insulating film is from about 0.5 to about 10 g./m.$^2$.

The chromic acid and the bichromate used for the treating solution may be replaced by chromates, but some care is required in the selection of the chromates because some chromates are non-water soluble.

The treating solution thus prepared above possess the advantage that the emulsion type resin is not destroyed by the chromic acid, and as a result, the adhesion of deteriorated resins on the pipe line and the sealing portion of the pump can be prevented. Also adhesion of the deteriorated resins on the roll during the roll coating is prevented, and thus the coating operation can be continued in a stabilized manner for a considerable length of time.

Some examples of the present invention will be set forth in comparison with controls.

EXAMPLE 1

8.8 kg. (0.5 kg. more than the dissolving limit) of zinc oxide were added to a solution obtained by dissolving 20 kg. of chromic acid in 100 kg. of water, and then 10 kg. of an emulsion type of acrylic resin (50% solution of copolymer of methylmethacrylate and methylacrylate) were added to the solution.

Figure 2:
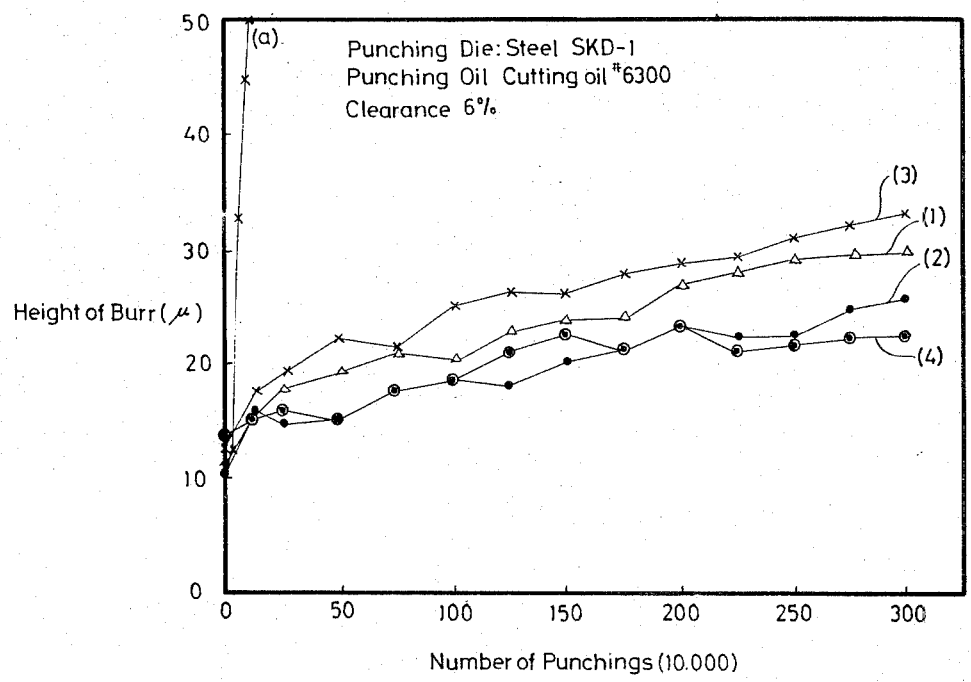
FIG. 2 is a graph showing the relation between the number of punching and the height of burr in case of the products obtained in Examples 1, 2, 3 and 4 in comparison with those of the conventional art.

This treating solution was coated by a rubber roll on an electrical steel strip (containing 3% of silicon) of 9.80 mm. width and 0.5 mm. thickness, and baking was done at 500° C. for 30 seconds. This treatment was continued on 700 tons of the steel sheets but no clogging of the pipe line or the pump were observed and a stable operation was achieved. The characteristics of the film thus formed on the products are shown in Table 1, and the results of punching operations are shown in FIG. 2(1).

COMPARISON 1

7.5 kg. (below the dissolving limit) of zinc oxide were added to a solution obtained by dissolving 20 kg. of chromic acid in 100 kg. of water, and 10 kg. of an emulsion type of acrylic resin (50% solution of a copolymer of methylmethacrylate and methylacrylate) were added thereto. Similar treatments as in Example 1 were done with the above treating solution. After the treatment of 2 tons of steel sheets, deteriorated resin adhered on the roll, thus causing spotted marks to appear on the steel sheet, and at the treatment of the fourth ton of steel sheet, the operation had to be stopped because of clogging of the pipe line.

EXAMPLE 2

1.9 kg. (0.4 kg. more than the dissolving limit) of magnesium hydroxide were added to a solution obtained by dissolving 24 kg. of magnesium dichromate in 100 kg. of water, and then 20 kg. of an emulsion type of a copolymer (45% solution) of vinyl acetate-acrylic resin were added thereto. Thus obtained treating solution was coated by a rubber roll on a rimmed electrical steel sheet, and baked at 400° C. for 45 seconds. This treatment was continued for 500 tons of the steel sheets, but no clogging of the pipe line and the pump were observed, and thus a stabilized operation could be conducted successfully. The properties of thus obtained films are shown in Table 1 and the results of punching operations are shown in FIG. 2(a).

COMPARISON 2

20 kg. of an emulsion type of a copolymer (4.5% solution) of vinyl acetate-acrylic resin were added to a solution obtained by dissolving 24 kg. of magnesium dichromate in 100 kg. of water. Similar treatments as in Example 2 were conducted with this treating solution. At the treatment of the third ton of steel sheets, the operation had to be stopped because of the clogging of the pump.

EXAMPLE 3

7.4 kg. (0.4 kg. more than the dissolving limit) of calcium hydroxide were added to a solution obtained by dissolving 20 kg. of chromic acid in 100 kg. of water, and then 20 kg. of an emulsion type of butadiene styrene copolymer (50% solution) were added thereto. This treating solution was coated by a rubber roll on an electrical steel sheet containing 2.3% of silicon and baked at 500° C. for 15 seconds.

This treatment was continued for 800 tons of the steel sheets, but no clogging of the pipe line and the pump were observed, and thus a stabilized operation could be conducted successfully. Properties of thus obtained films are shown in Table 1 and the results of stamping operations are shown in FIG. 2(3).

EXAMPLE 4

2.8 kg. (0.2 kg. more than the dissolving limit) of zinc oxide were added to a solution obtained by dissolving 20 kg. of chromic acid and then 5.8 kg. of magnesium carbonate in 100 kg. of water and then 15 kg. of an emulsion type of acrylic resin (50% solution of a copolymer of methylmethacrylate and butylacrylate) were added thereto.

This treating solution was coated by a rubber roll on an electrical steel sheet containing 0.3% of silicon, and baked at 450° C. for 30 seconds.

This treatment was continued for 900 tons of the steel sheets, but no clogging of the pipe line and the pump were observed and a stabilized operation could be conducted successfully. Properties of thus obtained films are shown in Table 1 and the results of punching operations are shown in FIG. 2(4).

EXAMPLE 5

6.9 kg. (0.1 kg. less than dissolving limit) of calcium hydroxide were added to a solution obtained by dissolving 20 kg. of chromic acid in 100 kg. of water, and then 15 kg. of an emulsion type of acrylic copolymer resin (50% solution of a copolymer of methylmethacrylate, ethylacrylate and butylacrylate) were added to the solution. This treating solution was coated by a rubber roll on an electrical steel sheet containing 0.3% of silicon and baked at 450° C. for 30 seconds. This treatment was continued for 600 tons of the steel sheets, but no clogging of the pipe line and the pump were observed, and a stabilized operation could be conducted successfully. Properties of thus obtained films are shown in Table 1.

EXAMPLE 6

8.6 kg. (0.3 kg. more than the dissolving limit) of zinc oxide were added to a solution obtained by dissolving 20 kg. of chromic acid in 100 kg. of water, and then 10 kg. of an emulsion type of acrylic resin (50% solution) were added thereto.

This treating solution was cooled to 180° C. by a refrigerator and coated by a rubber roll on an electrical steel sheet containing 0.3% of silicon, and baked at 450° C. for 40 seconds.

This treatment was continued for 2000 tons of the steel sheets, but no clogging of the pipe line and the pump were observed and a stabilized operation could be conducted successfully.

Properties of thus obtained films are shown in Table 1. By maintaining the treating solution at 18° C., the treating solution could be used after one week.

In case no cooling was effected, the treating solution was heated to 45° C. by the heat from the steel sheets, and at the end of the treatment of 400 tons of the steel sheets the pump was clogged and the operation was compelled to stop. The treating solution gelatinized after two days and could not be used again.

TABLE 1

|  | Example | | | | | | |
| --- | --- | --- | --- | --- | --- | --- | --- |
|  | 1 | 2 | 3 | 4 | 5 | 6 | Conventional [3] |
| Before stress, relieving annealing: | | | | | | | |
| Insulation, max | 150.2 | 305.5 | 190.2 | 200.5 | 323.0 | 166.0 | 55.5. |
| Resistance, min | 92.0 | 115.0 | 121.0 | 98.5 | 90.0 | 68.5 | 15.9. |
| (JIS second method) average | 101.0 | 180.0 | 162.0 | 123.5 | 133.0 | 85.5 | 32.5. |
| Adhesion (mm. $\phi$)[1] | 10 | 10 | 10 | 10 | 10 | 10 | 10. |
| Corrosion resistance [2] | ([4]) | ([4]) | ([4]) | ([4]) | ([4]) | ([4]) | Pit corrosion. |
| Pinhole | No | No | No | No | No | No | Several. |
| After stress, relieving annealing: | | | | | | | |
| Insulation, max | 30.1 | 55.5 | 29.5 | 45.5 | 48.8 | 45.5 | 8.5. |
| Resistance, min | 15.9 | 30.1 | 18.5 | 15.5 | 23.3 | 15.9 | 5.5. |
| (JIS second method) average | 28.7 | 45.2 | 24.3 | 32.6 | 35.5 | 24.3 | 7.0. |
| Adhesion (mm. $\phi$)[1] | 30 | 30 | 30 | 30 | 30 | 30 | 30. |
| Residual carbon | No | No | No | No | No | No | No. |

[1] The minimum diameter down to which the inside film does not change when the specimen is bent 180° C in a prescribed diameter.
[2] Rust formation after 24 hours of salt spray.
[3] Treated with a solution obtained by dissolving 20 kg. of chromic anhydride, 5.5 kg. of ZnO in 100 kg. of water and adding thereto 0.5 kg. of triethanolamine as a reducing agent.
[4] No rust.
Remarks: Annealing condition: 750° C×2 hours in 100% $N_2$ atmosphere.

From Table 1 it is clear that the insulation resistance, the film adhesion and the corrosion resistance of the products obtained by the present invention are excellent.

Also from FIG. 2(1) to (4) it is clearly understood that the height of burr after 30,000 punching is lower than 35μ which proves the excellent punching characteristics of the products obtained by the prsent invention.

As understood from the forgoing descriptions, the present invention provides remarkable industrial advantages in that a treating solution obtained by adding emulsion type resins to a chromic acid and/or bichromate solution which has hitherto been not used for industrial purposes can be stabilized by dissolving therein, oxides etc., of divalent metals, for example, at least up to its dissolution limit, and thus an insulating film of good punching characteristics can be formed in a stabilized manner for a long period of operation.

What is claimed is:

1. In a process for producing a stable insulating film possessing good punching characteristics on an electrical steel sheet by coating the steel sheet with an aqueous treating solution containing at least one chromium-containing compound of chromic acid or bichromate to which an emulsion type resin of vinyl acetate or its copolymer, butadiene-styrene copolymer, or acrylic resin or its copolymer, in an amount from 0.3 to 30 parts by weight to 10 parts by weight of chromium ion from said chromium-containing compound in the solution has been added, the improvement which comprises dissolving in the treating solution, prior to the addition of the resin, an acid soluble compound of oxide, hydroxide, or carbonate of a divalent metal, the amount of said acid soluble compound added being in the range from about the dissolving limit of said compound to 15 percent by weight more than the dissolving limit of said compound.

2. A process according to claim 1 in which the treating solution is coated on the steel sheet while the treating solution is forceably cooled below 25° C.

3. A process according to claim 1 in which the bichromate is a salt of potassium, sodium, magnesium, calcium or zinc.

4. A process according to claim 1 in which the oxide of the divalent metal is MgO, CaO, ZnO or CdO.

5. A process according to claim 1 in which the hydroxide of the divalent metal is $Mg(OH)_2$, $Ca(OH)_2$, $Zn(OH)_2$ or $Cd(OH)_2$.

6. A process according to claim 1 in which the carbonate of the divalent metal is $MgCO_3$, $CaCO_3$, $ZnCO_3$ or $CdCO_3$.

References Cited
UNITED STATES PATENTS

| | | | |
|---|---|---|---|
| 3,591,425 | 7/1971 | Shimanaka et al. | 148—6.2 |
| 3,666,568 | 5/1972 | Shimanaka et al. | 148—6.2 |
| 2,353,198 | 7/1944 | Soday | 117—66 |
| 2,223,037 | 11/1940 | Ihrig | 117—66 UX |
| 3,053,702 | 9/1962 | Schuster et al. | 148—6.2 |
| 3,094,435 | 6/1963 | Schuster et al. | 148—6.2 UX |
| 3,258,319 | 6/1966 | Cox | 117—132 X |
| 3,568,486 | 3/1971 | Rosenberg et al. | 117—132 X |
| 2,562,118 | 7/1951 | Osdal | 148—6.2 X |
| 3,478,554 | 11/1969 | Demsey et al. | 72—46 |
| 3,295,346 | 1/1967 | Bomberger | 72—41 |

WILLIAM D. MARTIN, Primary Examiner
H. J. GWINNELL, Assistant Examiner

U.S. Cl. X.R.

72—46; 117—132 C, 232